US010656951B2

(12) United States Patent
Chen et al.

(10) Patent No.: US 10,656,951 B2
(45) Date of Patent: May 19, 2020

(54) PIPELINE INCLUDING SEPARATE HARDWARE DATA PATHS FOR DIFFERENT INSTRUCTION TYPES

(71) Applicants: Advanced Micro Devices, Inc., Sunnyvale, CA (US); Advanced Micro Devices (Shanghai) Co., Ltd., Shanghai (CN)

(72) Inventors: Jiasheng Chen, Orlando, FL (US); YunXiao Zou, Shanghai (CN); Bin He, Orlando, FL (US); Angel E. Socarras, Orlando, FL (US); QingCheng Wang, Shanghai (CN); Wei Yuan, Shanghai (CN); Michael Mantor, Orlando, FL (US)

(73) Assignees: ADVANCED MICRO DEVICES, INC., Santa Clara, CA (US); ADVANCED MICRO DEVICES (SHANGHAI) CO., LTD., Shanghai (CN)

( * ) Notice: Subject to any disclaimer, the term of this patent is extended or adjusted under 35 U.S.C. 154(b) by 124 days.

(21) Appl. No.: 15/789,318

(22) Filed: Oct. 20, 2017

(65) Prior Publication Data
US 2018/0113714 A1      Apr. 26, 2018

(30) Foreign Application Priority Data
Oct. 21, 2016   (CN) .......................... 2016 1 0920423

(51) Int. Cl.
*G06F 9/30* (2018.01)
*G06F 9/38* (2018.01)
(Continued)

(52) U.S. Cl.
CPC .......... *G06F 9/3851* (2013.01); *G06F 9/3013* (2013.01); *G06F 9/30014* (2013.01);
(Continued)

(58) Field of Classification Search
CPC ..................................... G06F 9/3851
See application file for complete search history.

(56) References Cited

U.S. PATENT DOCUMENTS 5,450,607 A * 9/1995 Kowalczyk ........... G06F 9/3885
  708/524
5,471,626 A * 11/1995 Carnevale ............. G06F 9/3867
  712/219

(Continued)

OTHER PUBLICATIONS

Honarmand, Nima, "Processor Pipeline", CSE 502—Computer Architecture Lecture, Spring 2015, Stony Brook University, 52 pages.

*Primary Examiner* — William B Partridge

(57) ABSTRACT

A processing element is implemented in a stage of a pipeline and configured to execute an instruction. A first array of multiplexers is to provide information associated with the instruction to the processing element in response to the instruction being in a first set of instructions. A second array of multiplexers is to provide information associated with the instruction to the first processing element in response to the instruction being in a second set of instructions. A control unit is to gate at least one of power or a clock signal provided to the first array of multiplexers in response to the instruction being in the second set.

20 Claims, 5 Drawing Sheets

(51) Int. Cl.
*G06F 15/80* (2006.01)
*G06F 15/76* (2006.01)

(52) U.S. Cl.
CPC .......... *G06F 9/3814* (2013.01); *G06F 9/3836* (2013.01); *G06F 9/3869* (2013.01); *G06F 9/3885* (2013.01); *G06F 15/80* (2013.01); *G06F 2015/768* (2013.01)

(56) References Cited

U.S. PATENT DOCUMENTS

| | | | |
|---|---|---|---|
| 6,715,023 B1* | 3/2004 | Abu-Lebdeh | G06F 13/4252 |
| | | | 710/310 |
| 7,075,542 B1* | 7/2006 | Leather | G06T 15/005 |
| | | | 345/505 |
| 8,497,865 B2* | 7/2013 | Bakalash | G06T 15/005 |
| | | | 345/501 |
| 8,730,249 B2 | 5/2014 | Danskin et al. | |
| 8,743,117 B2 | 6/2014 | Redshaw | |
| 9,019,284 B2 | 4/2015 | Meixner | |
| 9,202,308 B2 | 12/2015 | Keramidas et al. | |
| 2004/0255105 A1* | 12/2004 | Chung | G06F 9/3851 |
| | | | 713/1 |
| 2009/0265528 A1* | 10/2009 | Du | G06F 8/47 |
| | | | 712/220 |

* cited by examiner

PIPELINE INCLUDING SEPARATE HARDWARE DATA PATHS FOR DIFFERENT INSTRUCTION TYPES

BACKGROUND

A pipeline in a computing system includes multiple processing elements connected in series so that the output of one processing element is input to the next processing element in the pipeline. The processing elements in the pipeline can therefore be operating concurrently on different instructions as the instructions move through the pipeline. At least in part to reduce the area cost of fabricating the integrated circuits that are used to implement the pipeline, resources of the pipeline are shared by all of the instructions that are supported by the computing system. In some cases, the supported instruction set can include hundreds of different types of instructions. The supported instructions include multiplication (MUL), multiplication-accumulation (MAD), fused multiplication-accumulation (FMA), addition (ADD), fraction extraction (FRACT), maximum (MAX), minimum (MIN), Boolean logic (e.g., AND, OR, XOR, or NOT operations), format conversion, and the like. The computing system can support multiple data formats for the instructions including half-precision floating point, single precision floating point, double precision floating point, 16-bit integer (or unsigned integer), 24-bit integer (or unsigned integer), 32-bit integer (or unsigned integer), 64-bit integer (or unsigned integer), bit-level instructions, and the like. The pipeline can also support transcendental functions.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
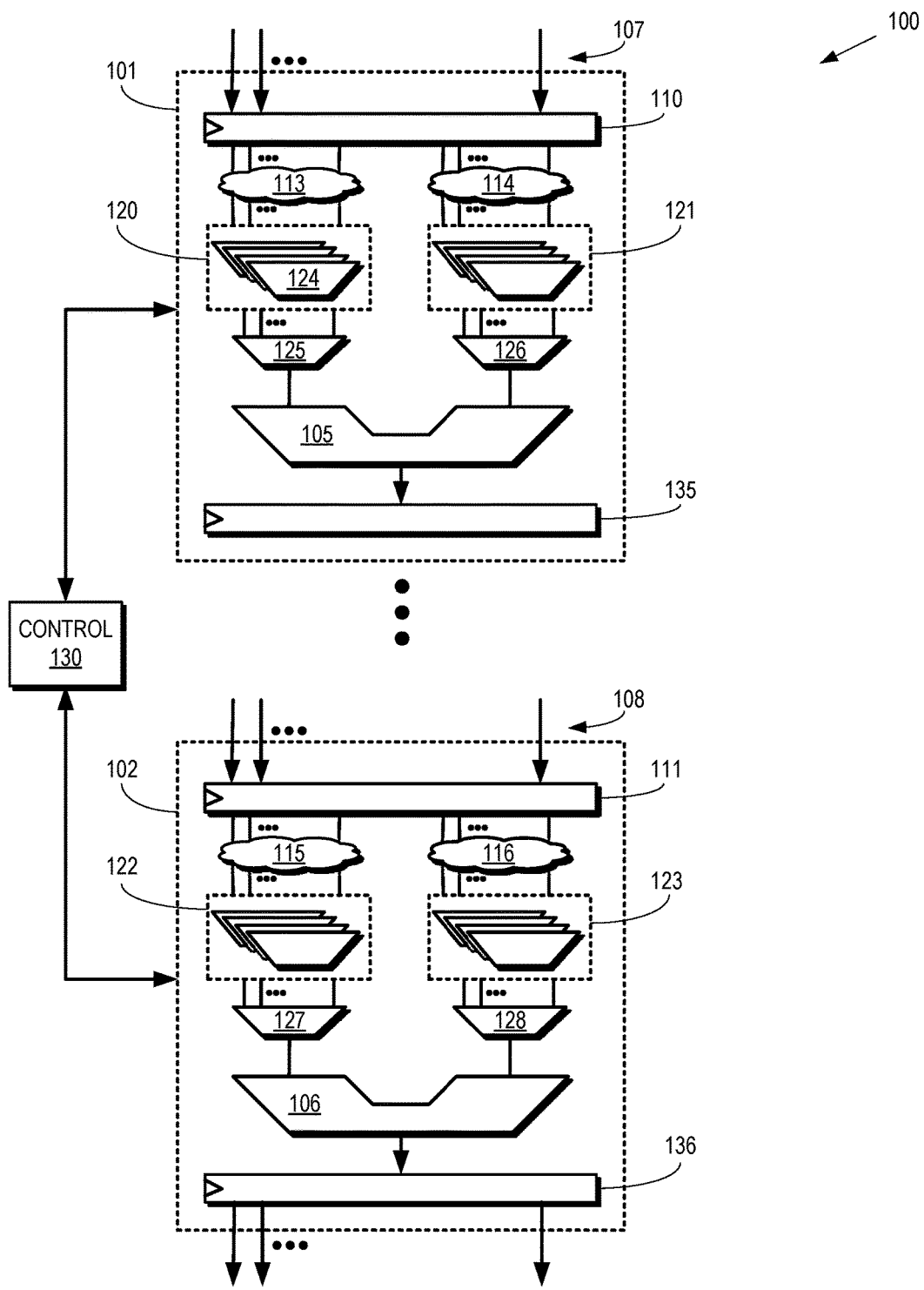
FIG. 1 is a block diagram of a pipeline that is implemented in a computer system.

Data associated with different instructions are multiplexed together using an array of multi-input multiplexers so that the instructions often share a single hardware data path used to implement the pipeline. Data for each instruction type is multiplexed into the pipeline using a separate multi-input multiplexer. Thus, the number of multiplexers that are needed to multiplex instructions into the pipeline is approximately proportional to the total number of instructions that share the hardware data path. All of the multiplexers are toggled in response to performing operations to ensure that the correct values are at the outputs of the multiplexers so that the correct values are provided to the processing elements in the pipeline. The power consumed by the array of multi-input multiplexers therefore increases approximately in proportion to the total number of instructions that are multiplexed into the pipeline by the array. Supporting hundreds of different types of instructions can lead to significant power dissipation in the array of multi-input multiplexers, even though most types of instructions are rarely, if ever, used in programs that are executed on the pipeline. For example, graphics-intensive programs such as gaming applications are often implemented with only 5-10 frequently-used instructions, supplemented by occasional calls to less frequently used instructions.

The power consumption of a pipeline is significantly reduced with only a modest increase in area cost by implementing a first array of multiplexers to multiplex data for a set of instructions to a processing element in the pipeline and a second array of multiplexers to multiplex data for a subset of the set of instructions to the processing element. Power and clock signals to the first array of multiplexers are selectively gated based on a type of an instruction that is to be executed by the processing element. The second array of multiplexers provides data for the instruction that is to be executed by the processing element in response to gating the power and clock signals to the first array of multiplexers. For example, a control unit gates the power and clock signals to the first array of multiplexers for a first type of instruction, in which case the second array of multiplexers provides the data for the first type of instruction to the processing element. The control unit does not gate power and clock signals to the first array of multiplexers for a second type of instruction so that the first array of multiplexers provides the data for the second type of instruction to the processing element. In some embodiments, the first type of instruction includes all the instructions in the set of instructions that is supported by the processing element except for a subset of the instructions that is determined based on a usage frequency of the instructions. For example, an instruction is included in the subset of instructions if it is executed in the pipeline at a frequency that is above a threshold. Instructions in the subset are referred to as "core instructions" and other instructions are referred to as "non-core instructions."

A first set of input registers provides input to the first array of multiplexers and the output from the first array of multiplexers is provided to a first set of output registers. A second set of registers provides input to the second array of multiplexers and the output from the second array of multiplexers is provided to a second set of output registers. The control unit selectively gates power and clock signals for the first set of input registers and the first set of output registers based on the type of the instruction that is to be executed by the processing element. Some embodiments of the pipeline include a plurality of stages and each stage includes corresponding first and second arrays of multiplexers that share a processing element that is implemented in the stage. The control unit selectively gates power and clock signals for the first array of multiplexers in each stage of the pipeline based on the type of instruction that is to be executed by the corresponding computational unit. The control unit is also able to selectively gate power and clock signals for input and output registers for the first array of multiplexers in each stage based on the type of instruction.

FIG. 1 is a block diagram of a pipeline 100 that is implemented in a computer system. The pipeline 100 includes one or more stages 101, 102 that are connected in series. Each of the stages 101, 102 includes a corresponding processing element 105, 106 that is configured to perform operations on input data in accordance with an input instruction. In an example, the input data includes source operands and the input instruction is indicated by an opcode. The operations performed on the input data by the processing elements 105, 106 include multiplication, addition, rounding, and the like. Some embodiments of the pipeline 100 support an instruction set that includes multiplication (MUL), multiplication-accumulation (MAD), fused multiplication-accumulation (FMA), addition (ADD), fraction extraction (FRACT), maximum (MAX), minimum (MIN), Boolean logic (e.g., AND, OR, XOR, or NOT operations), format conversion, and the like. The pipeline 100 supports multiple data formats for the instructions including half-precision floating point, single precision floating point, double precision floating point, 16-bit integer (or unsigned integer), 24-bit integer (or unsigned integer), 32-bit integer (or unsigned integer), 64-bit integer (or unsigned integer), bit-level instructions, and the like. The pipeline 100 can also support transcendental functions.

The data and instructions are provided as input information 107, 108 that is received and stored by corresponding registers 110, 111. Networking circuitry 113, 114, 115, 116 (collectively referred to herein as "the circuitry 113-116") is used to connect the registers 110, 111 to corresponding arrays 120, 121, 122, 123 of multiplexers 124 (only one indicated by a reference numeral in the interest of clarity) that are collectively referred to herein as "the multiplexer arrays 120-123." The circuitry 113-116 is implemented using lines, traces, wires, switches, routers, and the like. Each multiplexer in the multiplexer arrays 120-123 receives input information 107, 108 for a different instruction. Consequently, the number of multiplexers in the multiplexer arrays 120-123 is set by the number of instructions supported by the pipeline 100. In some embodiments, the number of supported instructions exceeds one hundred and is as large as several hundred instructions or more in some embodiments of the pipeline 100. The multiplexer arrays 120-123 provide output signals to corresponding multiplexers 125, 126, 127, 128 (collectively referred to herein as "the multiplexers 125-128") that multiplex the information received from the multiplexer arrays 120-123 to inputs of the processing elements 105, 106.

A control unit 130 provides control signals to select the input information 107, 108 that is provided to the processing element 105 by the multiplexer arrays 120-123 and the multiplexers 125-128. The input information 107, 108 includes information identifying the instructions such as opcodes or other instruction identifiers. The control unit 130 generates the control signals based on the information identifying the instructions and provides these control signals to the control inputs of the multiplexers in the multiplexer arrays 120-123 and the multiplexers 125-128. Output signals generated by the processing elements 105, 106 are provided to corresponding output registers 135, 136. Some embodiments of the output registers 135, 136 also function as (or are connected to) input registers of a subsequent stage of the pipeline 100.

As discussed herein, the multiplexers in the multiplexer arrays 120-123 and the multiplexers 125-128 are toggled to ensure that the correct values are at the outputs of the multiplexers in the multiplexer arrays 120-123 and the multiplexers 125-128 so that the correct values are provided to the processing elements 105, 106. For example, the multiplexers in the multiplexer arrays 120-123 and the multiplexers 125-128 are toggled in response to detecting a rising edge or a falling edge of a clock signal provided to the stages 101, 102 of the pipeline 100. The power consumed by the multiplexers in the multiplexer arrays 120-123 increases approximately in proportion to the total number of instructions that are multiplexed into the pipeline 100 by the multiplexers in the multiplexer arrays 120-123. Supporting hundreds of different types of instructions therefore causes significant power dissipation by the multiplexers in the multiplexer arrays 120-123, even though most types of instructions are rarely, if ever, used in programs that are executed by the pipeline 100. For example, graphics-intensive programs such as gaming applications are often implemented with 5-10 frequently-used instructions, supplemented by occasional calls to less frequently used instructions.

Figure 2:
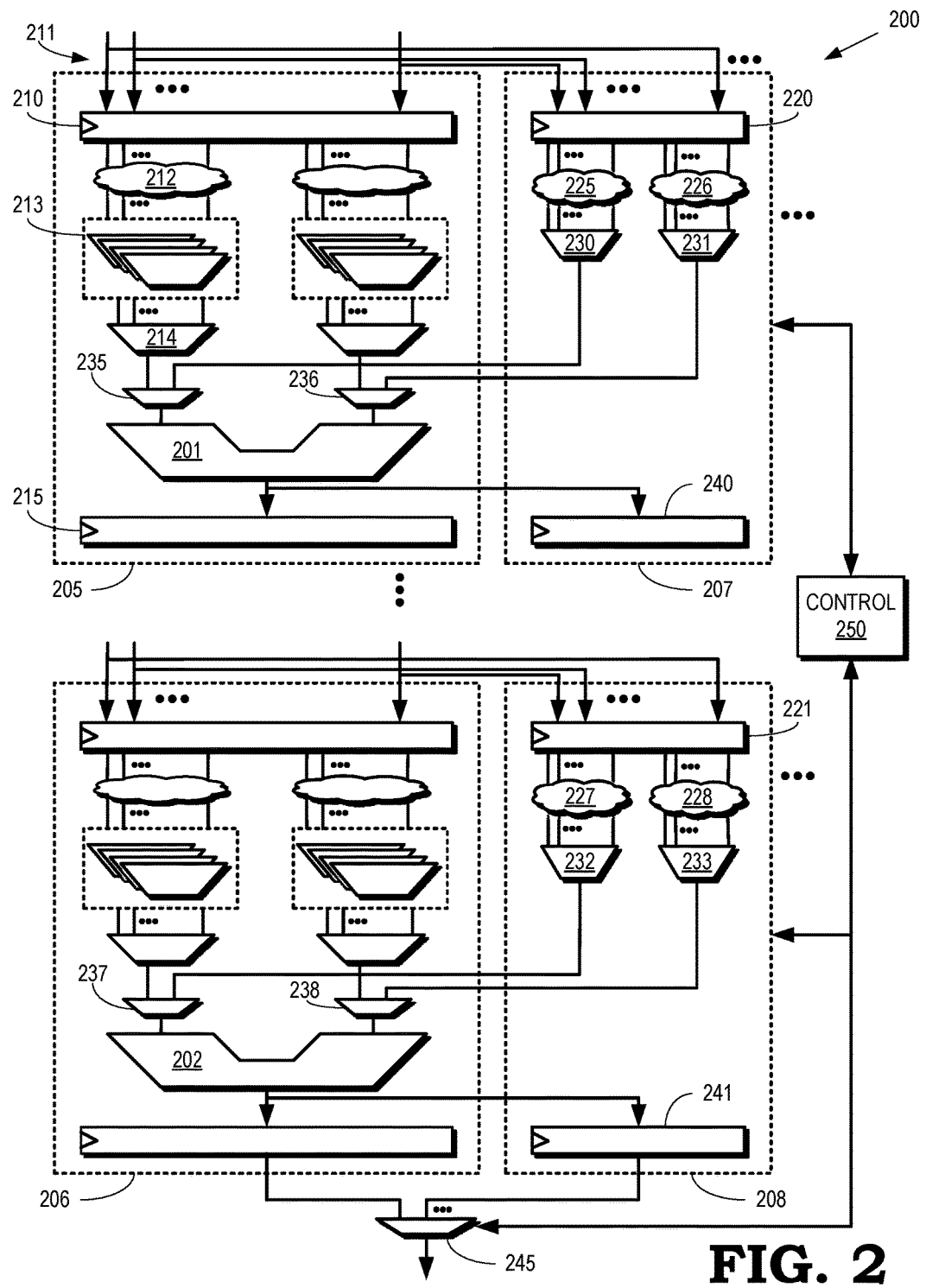
FIG. 2 is a block diagram of a pipeline that includes two or more hardware data paths to multiplex data and instructions for different instruction types onto shared processing elements in a pipeline according to some embodiments.

FIG. 2 is a block diagram of a pipeline 200 that includes two or more hardware data paths to multiplex data and instructions for different instruction types onto shared processing elements 201, 202 in a pipeline according to some embodiments. The first hardware data path includes the stages 205, 206 and the second hardware data path includes the stages 207, 208. The stages 205, 206 include input registers 210 that receive input information 211 (such as data and instructions), networking circuitry 212, multiplexer arrays 213, multiplexers 214, and output registers 215. In the interest of clarity, only one of each of these elements of the stages 205, 206 is indicated by a reference numeral. The elements 212, 213, 214, 215 of the stages 205. 206 are configured to operate in a manner similar to the corresponding elements shown in FIG. 1. Some embodiments of the stages 205, 206 are configured to receive input information 211 for all of the instructions supported by the pipeline 200. Other embodiments of the stages 205, 206 are configured to receive input information 211 for all of the instruction supported by the pipeline 200 except for a subset of the instructions that are supported by the second hardware data path, as discussed herein.

The stages 207, 208 in the second hardware data path include input registers 220, 221 that receive some or all of the input information 211. For example, the input registers 220, 221 is configured to receive only input information 211 associated with a subset of instructions that are supported by the second hardware data path. For example, the input information 211 includes an opcode indicating the instruction type and source operands that are to be operated on by the corresponding processing element 201, 202 to carry out the instruction. The subset of instructions includes instructions that are frequently executed in the pipeline 200. In some embodiments, the subset of instructions includes instructions that are executed at or above a threshold frequency. The instruction set can include at least ten times as many instructions as are in the subset of instructions. For example, the subset of instructions can include ten or fewer instructions from the instruction set supported by the pipeline 200. Instructions that are not in the subset of instructions, e.g., instructions that are executed less frequently than the threshold frequency, are executed using the stages 205, 206 of the first hardware data path. Instructions in the subset are referred to as "core instructions" and instructions that are not in the subset are referred to herein as "non-core instructions."

Network circuitry 225, 226, 227, 228 (collectively referred to herein as "the circuitry 225-228") provides interconnections between the input registers 220, 221 and corresponding arrays 230, 231, 232, 233 of multiplexers (collectively referred to as "the multiplexer arrays 230-233"). The circuitry 225-228 is implemented using lines, traces, wires, switches, routers, and the like. Each multiplexer in the multiplexer arrays 230-233 receives information corresponding to a different instruction or instruction type. The number of multiplexers in the multiplexer arrays 230-233 is therefore determined by the number of instructions in the subset of instructions that is processed in the stages 207, 208 of the second hardware data path. For example, the multiplexer arrays 230-233 includes a number of multiplexers that is sufficient to multiplex the information 211 associated with ten or less core instructions onto the corresponding processing elements 201, 202. The number of multiplexers in the multiplexer arrays 230-233 is therefore less than the number of multiplexers in the multiplexer arrays 213 in the stages 205, 206 of the first hardware data path.

Output signals from the multiplexer arrays 230-233 are provided to corresponding multiplexers 235, 236, 237, 238 (collectively referred to herein as "the multiplexers 235-238") in the stages 205, 206 of the first hardware data path. The multiplexers 235-238 also receive input from the multiplexer arrays 214 in the stages 205, 206 of the first hardware data path. The multiplexers 235-238 are configured to selectively provide the inputs received from the multiplexer arrays 230-233 or the multiplexer arrays 214 to the processing elements 201, 202 based on the type of instruction that is to be executed by the processing elements 201, 202. For example, the multiplexer 235 provides the inputs received from the multiplexer array 230 to the processing element 201 if the type of instruction indicates that the instruction is a core instruction that is being processed using the stages 207, 208 in the second hardware data path. For another example, the multiplexer 235 provides the inputs received from the multiplexer 214 if the type of instruction indicates that the instruction is a non-core instruction that is being processed using the stages 205, 206 and the first hardware data path.

The stages 207, 208 in the second hardware data path include output registers 240, 241. The processing elements 201, 202 provide output signals to the output registers 215 in the stages 205, 206 of the first hardware data path and the output registers 240, 241 in the stages 207, 208 of the second hardware data path. Information stored in the output registers 215 in the stage 205 in the first hardware data path and the output register 240 in the second hardware data path are available for access by a subsequent stage in the first and second hardware data paths, respectively. Information stored in the output registers of the stage 206 and the output register 241 in the second hardware data path are provided to a multiplexer 245 that is configured to selectively provide the input provided by the output registers of the stage 206 or the input provided by the output registers 241 of the stage 208 in response to a selection signal. The value of the selection signal is determined based on the type of instruction. For example, the multiplexer 245 provides the input provided by the output registers 241 in response to the instruction type indicating that the instruction is a core instruction that is processed using the second hardware data path.

A control unit 250 is configured to provide signaling to the stages 205, 206 in the first hardware data path, the stages 207, 208 in the second hardware data path, and the multiplexer 245. The control unit 250 determines the provided signaling based on the instruction types of the instructions received by the pipeline 200. For example, in response to receiving core instruction processed using the second hardware data path, the control unit 250 provides control signaling to the multiplexer arrays 230-233 and the multiplexers 235-238 to route the input information 211 from the input registers 220, 221 to the processing elements 201, 202. The control unit 250 also provides control signaling to a control input of the multiplexer 245 to indicate that the multiplexer 245 is to provide information stored in the output register 241 as an output of the pipeline 200.

The control unit 250 is also configured to selectively gate power or clock signals to the multiplexer arrays 213 in the stages 205, 206 of the first hardware data path based on the type of instruction received by the pipeline 200. For example, the control unit 250 does not gate power or clock signals to the multiplexer arrays 213 in the stages 205, 206 in response to determining that an instruction received by the pipeline 200 is a non-core instruction. Instead, power and clock signals are provided to the multiplexer arrays 213 so that the multiplexer arrays 213 are toggled to provide information to the processing elements 201, 202 for executing the non-core instruction, as discussed herein. For another example, the control unit 250 gates power or clock signals to the multiplexer arrays 213 in the stages 205, 206 in response to determining that an instruction received by the pipeline 200 is a core instruction that is to be processed using the stages 207, 208 in the second hardware data path. In that circumstance, the multiplexer arrays 230-233 provide signaling to the corresponding processing elements 201, 202. Gating the power or clock signals to the multiplexer arrays 213 prevents the multiplexer arrays 213 from being toggled, thereby reducing the power dissipated in the pipeline 200 are processing core instructions.

Although not shown in FIG. 2, some embodiments of the pipeline 200 include additional hardware data paths that are structured in a manner similar to the second hardware data path and are used to execute instructions in a corresponding subset. For example, the pipeline 200 can be configured to support execution of a first subset of core instructions using the second hardware data path and one or more second subsets of core instructions using one or more third hardware data paths. If the pipeline 200 is configured to include more than two hardware data paths, the multiplexer 245 is configured to selectively provide the outputs from the first hardware data path, the second hardware data path, or the one or more third hardware data paths in response to signaling from the control unit 250. In some embodiments, different numbers of stages are implemented in the different hardware data paths to support execution of different subsets of core instructions and non-core instructions.

Figure 3:
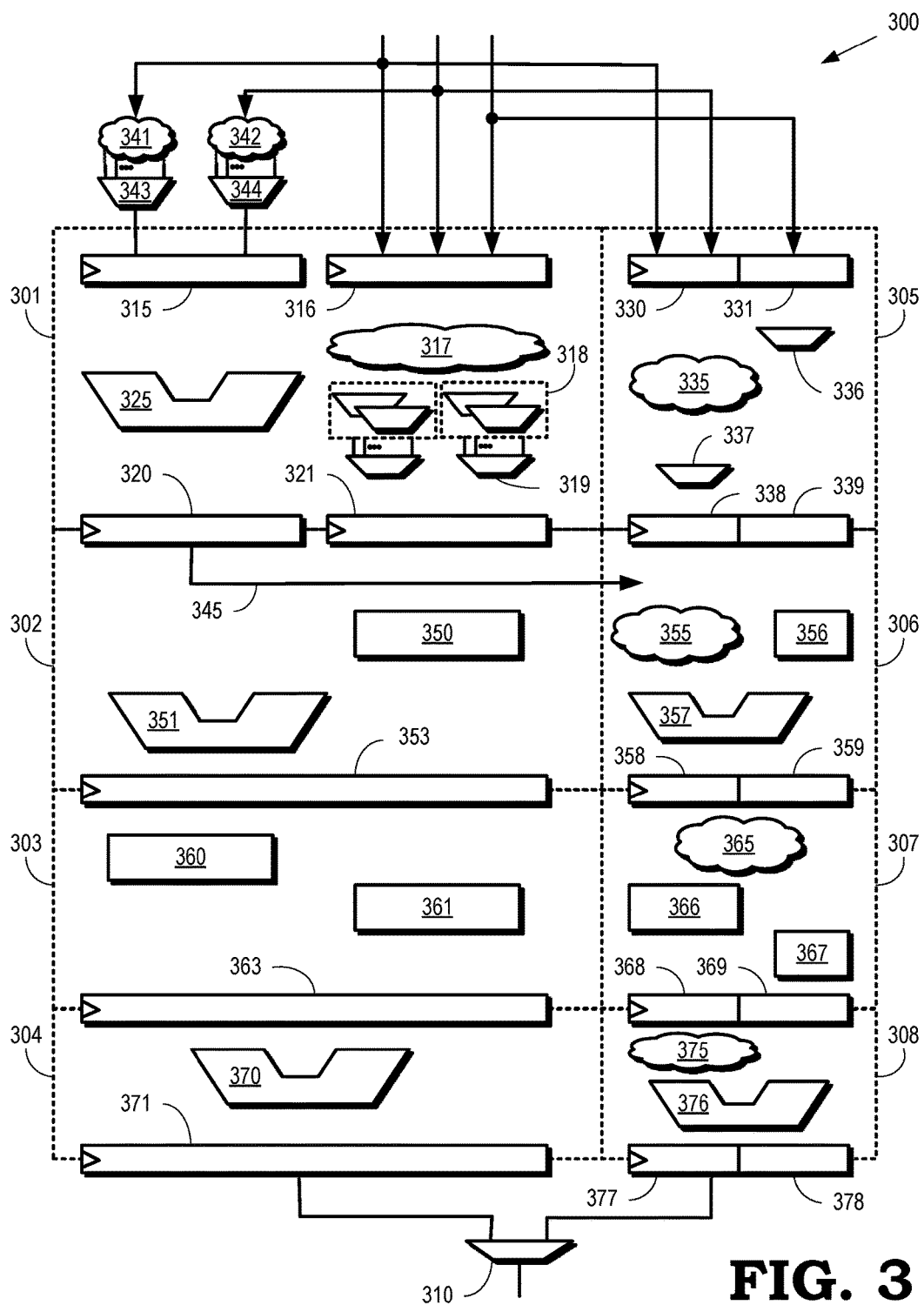
FIG. 3 is a block diagram of a pipeline that includes two hardware data paths that include both shared and dedicated hardware logic according to some embodiments.

FIG. 3 is a block diagram of a pipeline 300 that includes two hardware data paths that include both shared and dedicated hardware logic according to some embodiments. The first hardware data path includes the stages 301, 302, 303, 304 (collectively referred to herein as "the stages 301-304") and the second hardware data path includes the stages 305, 306, 307, 308 (collectively referred to herein as "the stages 305-308"). The pipeline 300 also includes a multiplexer 310 that is configured to receive output from the stages 304, 308 and selectively provide the output as the output of the pipeline 300. For example, the multiplexer 310 provides output from the stage 304 in response to the instruction being a non-core instruction and the multiplexer 310 provides output from the stage 308 in response to the instruction being a core instruction. As discussed herein, the multiplexer 310 receives control signals from a control unit (not shown in FIG. 3 in the interest of clarity) and selectively provides the output responsive to the control signals. Although not shown in FIG. 3, some embodiments of the pipeline 300 include more than two hardware data paths to execute different subsets of core instructions or non-core instructions.

The stage 301 in the first hardware data path includes input registers 315, 316, networking circuitry 317, multiplexer arrays 318, multiplexers 319, and output registers 320, 321. The stage 301 also includes a processing element 325 such as a multiplier unit. The multiplexers 319 are configured to provide signals to the inputs of the processing element 325, as discussed herein. In the interest of clarity, the specific interconnections between the elements of the stage 301 are not shown in FIG. 3. In the illustrated embodiment, the input register 315 receives data representing numbers that are to be multiplied together by the processing element 325. The input register 316 receives source inputs that include other data to be processed in the pipeline 300.

The stage 305 in the second hardware data path includes input registers 330, 331, half-precision logic 335 for executing half-precision instructions, multiplexers 336, 337, and output registers 338, 339. The input register 330 receives data representing numbers that are to be multiplied together and the input register 331 receives source inputs that include the other data to be processed in the pipeline 300. The multiplexers 336 are used to route information associated with half-precision instructions from the input registers 330, 331 to the half-precision logic 335 and the multiplexers 337 are used to route information from the half-precision logic 335 to the output registers 338, 339. In the interest of clarity, interconnections between the entities in the stage 305 are not shown in FIG. 3.

The half-precision logic 335 in the stage 305 is only configured to perform operations on half-precision instructions and is not configured to perform multiplication on single precision or double precision numbers. Thus, in the case of core instructions that operate on single precision or double precision numbers, input information representative of the numbers to be multiplied is also multiplexed into the register 315 in the first hardware data path so that the processing element 325 can be shared. For example, networking circuitry 341, 342 and multiplexer arrays 343, 344 can be used to multiplex information associated with core instructions on to the first hardware data path to share the processing element 325. Information stored in the output register 320 can therefore be provided to the second hardware data path, as indicated by the arrow 345.

The stage 302 in the first hardware data path includes a shift right unit 350 and an adder 351. The shift right unit 350 is used to perform shift right operations to align mantissas of floating point instructions prior to performing addition of the floating-point instructions using the adder 351. For example, the shift right unit 350 is used to align mantissas for instructions such as 32-bit float add and 32-bit FMA (fused multiply-accumulate) that can be performed by the adder 351. The stage 302 in the first hardware data path also includes output registers 353 that receive the results of the instructions executed by the adder 351. The output registers 320, 321 function as input registers for the stage 302. Although not shown in FIG. 3 in the interest of clarity, the stage 302 also includes arrays of multiplexers to multiplex instruction information to the shift right unit 350 and the adder 351.

The stage 306 in the second hardware data path includes half-precision logic unit 355, a shift right unit 356, and an adder 357. These elements function in a manner similar to the corresponding elements in the stages 302, 305. The registers 338, 339 function as input registers to the stage 306, which also includes output registers 358, 359. In the illustrated embodiment, the stages 302, 306 do not share hardware elements between the first and second hardware data path because the stages 302, 306 implement similar hardware elements. Although not shown in FIG. 3 in the interest of clarity, the stage 306 also includes arrays of multiplexers to multiplex instruction information to the half-precision logic unit 355, the shift right unit 356, and the adder 357.

The stage 303 in the first hardware data path implements a leading zero detector 360 and a shift left unit 361. Following addition of two operands in the adder 351, the most significant bits of the mantissa of the results could be zero if the two operands have different signs. The leading zero detector 360 determines a number of leading zeros in the mantissa and provide this information to the shift left unit 361, which performs a corresponding number of shift left operations to normalize the mantissa. The stage 303 also includes an output register 363. The output register 353 of the stage 302 functions as an input register to the stage 303. Although not shown in FIG. 3 in the interest of clarity, the stage 303 also includes arrays of multiplexers to multiplex instruction information to the leading zero detector 360 and the shift left unit 361.

The stage 307 in the second hardware data path includes half-precision logic unit 365, a leading zero detector 366 and a shift left unit 367. These elements function in a manner similar to the corresponding elements in the stages 303, 306. The registers 358, 359 function as input registers to the stage 307, which also includes output registers 368, 369. In the illustrated embodiment, the stages 303, 307 do not share hardware elements between the first and second hardware data path because the stages 303, 307 implement similar hardware elements. Although not shown in FIG. 3 in the interest of clarity, the stage 307 also includes arrays of multiplexers to multiplex instruction information to the half-precision logic unit 365, the leading zero detector 366, and the shift left unit 367.

The stage 304 includes a rounding element 370 that is used to perform rounding on input operands. The stage 304 also includes an output register 371. The output register 363 of the stage 303 functions as an input register to the stage 304. Although not shown in FIG. 3 in the interest of clarity, the stage 304 also includes arrays of multiplexers to multiplex instruction information to the rounding element 370.

The stage 308 includes half-precision logic 375 and a rounding element 376. The stage 308 also includes output registers 377, 378. The output registers 368, 369 function as the input registers for the stage 308. In the illustrated embodiment, the stages 304, 308 do not share hardware elements between the first and second hardware data path because the stages 304, 308 implement similar hardware elements. Although not shown in FIG. 3 in the interest of clarity, the stage 308 also includes arrays of multiplexers to multiplex instruction information to the half-precision logic 375 and the rounding element 376.

Figure 4:
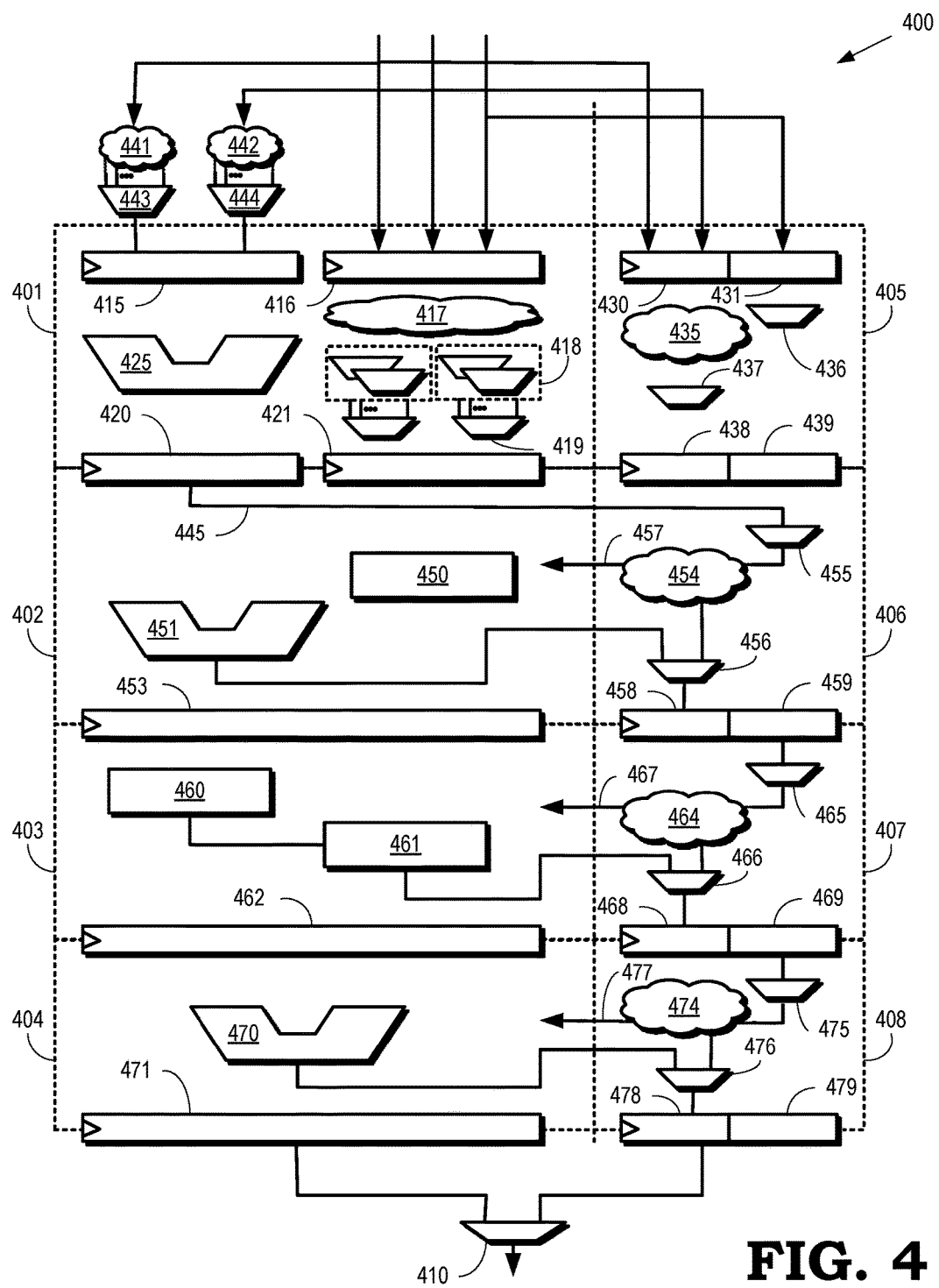
FIG. 4 is a block diagram of a pipeline that includes two hardware data paths that share hardware logic in the first hardware data path according to some embodiments.

FIG. 4 is a block diagram of a pipeline 400 that includes two hardware data paths that share hardware logic in the first hardware data path according to some embodiments. The first hardware data path includes the stages 401, 402, 403, 404 (collectively referred to herein as "the stages 401-404") and the second hardware data path includes the stages 405, 406, 407, 408 (collectively referred to herein as "the stages 405-408"). The pipeline 400 also includes a multiplexer 410 that is configured to receive output from the stages 404, 408 and selectively provide the output as the output of the pipeline 400. For example, the multiplexer 410 provides output from the stage 404 in response to the instruction being a non-core instruction and the multiplexer 410 provides output from the stage 408 in response to the instruction being a core instruction. As discussed herein, the multiplexer 410 receives control signals from a control unit (not shown in FIG. 3 in the interest of clarity) and selectively provide the output responsive to the control signals. Although not shown in FIG. 4, some embodiments of the pipeline 400 implement more than two hardware data paths to execute different subsets of core instructions or non-core instructions.

The stage 401 in the first hardware data path includes input registers 415, 416, networking circuitry 417, multiplexer arrays 418, multiplexers 419, and output registers 420, 421. The stage 401 also includes a processing element 425 such as a multiplier unit. The multiplexers 419 are configured to provide signals to the inputs of the processing element 425, as discussed herein. In the interest of clarity, the specific interconnections between the elements of the stage 401 are not shown in FIG. 4. In the illustrated embodiment, the input register 415 receives data representing numbers that are to be multiplied together by the processing element 425. The input register 416 receives source inputs that include other data to be processed in the pipeline 400.

The stage 405 in the second hardware data path includes input registers 430, 431, half-precision logic 435 for executing half-precision instructions, multiplexers 436, 437, and output registers 438, 439. The input register 430 receives data representing numbers that are to be multiplied together and the input register 431 receives source inputs that include the other data to be processed in the pipeline 400. The multiplexers 436 are used to route information associated with half-precision instructions from the input registers 430, 431 to the half-precision logic 435 and the multiplexers 437 are used to route information from the half-precision logic 435 to the output registers 438, 439. In the interest of clarity, interconnections between the entities in the stage 405 are not shown in FIG. 4.

The half-precision logic 435 in the stage 405 is only configured to perform operations on half-precision floating point instructions and is not configured to perform multiplication on single precision or double precision numbers. Thus, in the case of core instructions that operate on single precision or double precision numbers, input information representative of the numbers to be multiplied is also multiplexed into the register 415 in the first hardware data path so that the processing element 425 can be shared. For example, networking circuitry 441, 442 and multiplexer arrays 443, 444 can be used to multiplex information associated with core instructions on to the first hardware data path to share the processing element 425. Information stored in the output register 420 can therefore be provided to the second hardware data path, as indicated by the arrow 445.

The stage 402 in the first hardware data path includes a shift right unit 450 and an adder 451. The shift right unit 450 is used to perform shift right operations to align mantissas of floating point instructions prior to performing addition of the floating-point instructions using the adder 451. For example, the shift right unit 450 is used to align mantissas for instructions such as 32-bit float add and 32-bit FMA (fused multiply-accumulate) that can be performed by the adder 451. The stage 402 in the first hardware data path also includes output registers 453 that receive the results of the instructions executed by the adder 451. The output registers 420, 421 function as input registers for the stage 402. Although not shown in FIG. 4 in the interest of clarity, the stage 402 also includes arrays of multiplexers to multiplex instruction information to the shift right unit 450 and the adder 451.

The stage 406 in the second hardware data path includes half-precision logic 454 and multiplexer arrays 455, 456 that have a number of multiplexers that correspond to the number of core instructions. The stage 406 does not include hardware for implementing shift right operations or addition operations. The multiplexer array 455 in the stage 406 therefore routes information (such as data or opcodes) associated with core instructions to the shift right unit 450 and the adder 451 in the stage 402 in the first hardware data path, as indicated by the arrow 457. Results of operations performed by the adder 451 are provided as input to the multiplexer array 456. The registers 438, 439 function as input registers to the stage 406, which also includes output registers 458, 459. As discussed herein, selection of inputs to the multiplexer arrays 455, 456 for provision to the outputs of the multiplexer arrays 455, 456 is controlled by signaling provided by a control unit (not shown in FIG. 4 in the interest of clarity).

The stage 403 in the first hardware data path implements a leading zero detector 460 and a shift left unit 461. Following addition of two operands in the adder 451, the most significant bits of the mantissa of the results could be zero if the two operands have different signs. The leading zero detector 460 determines a number of leading zeros in the mantissa and provide this information to the shift left unit 461, which performs a corresponding number of shift left operations to normalize the mantissa. The stage 403 also includes an output register 462. The output register 453 of the stage 402 functions as an input register to the stage 403. Although not shown in FIG. 4 in the interest of clarity, the stage 403 also includes arrays of multiplexers to multiplex instruction information to the leading zero detector 460 and the shift left unit 461.

The stage 407 in the second hardware data path includes half-precision logic 464 and multiplexer arrays 465, 466 that have a number of multiplexers that correspond to the number of core instructions. The stage 407 does not include hardware for implementing leading zero detection or shift left operations. The multiplexer array 465 in the stage 407 therefore routes information (such as data or opcodes) associated with core instructions to the leading zero detector 460 and the shift left unit 461 in the stage 403 in the first hardware data path, as indicated by the arrow 467. Results of operations performed by the shift left unit 461 are provided as input to the multiplexer array 466. The registers 458, 459 function as input registers to the stage 407, which also includes output registers 468, 469. As discussed herein, selection of inputs to the multiplexer arrays 465, 466 for provision to the outputs of the multiplexer arrays 465, 466 is controlled by signaling provided by a control unit (not shown in FIG. 4 in the interest of clarity).

The stage 404 in the first hardware data path implements a rounding element 470. The stage 404 also includes an output register 471. The output register 462 of the stage 403 functions as an input register to the stage 404. Although not shown in FIG. 4 in the interest of clarity, the stage 403 also includes arrays of multiplexers to multiplex instruction information to the rounding element 470.

The stage 408 in the second hardware data path includes half-precision logic 474 and multiplexer arrays 475, 476 that have a number of multiplexers that correspond to the number of core instructions. The stage 408 does not include hardware for implementing rounding operations. The multiplexer array 475 in the stage 408 therefore routes information (such as data or opcodes) associated with core instructions to the rounding element 470 in the stage 404 in the first hardware data path, as indicated by the arrow 477.

Results of operations performed by the rounding element 470 are provided as input to the multiplexer array 476. The registers 468, 469 function as input registers to the stage 408, which also includes output registers 478, 479. As discussed herein, selection of inputs to the multiplexer arrays 475, 476 for provision to the outputs of the multiplexer arrays 475, 476 is controlled by signaling provided by a control unit (not shown in FIG. 4 in the interest of clarity).

Figure 5:
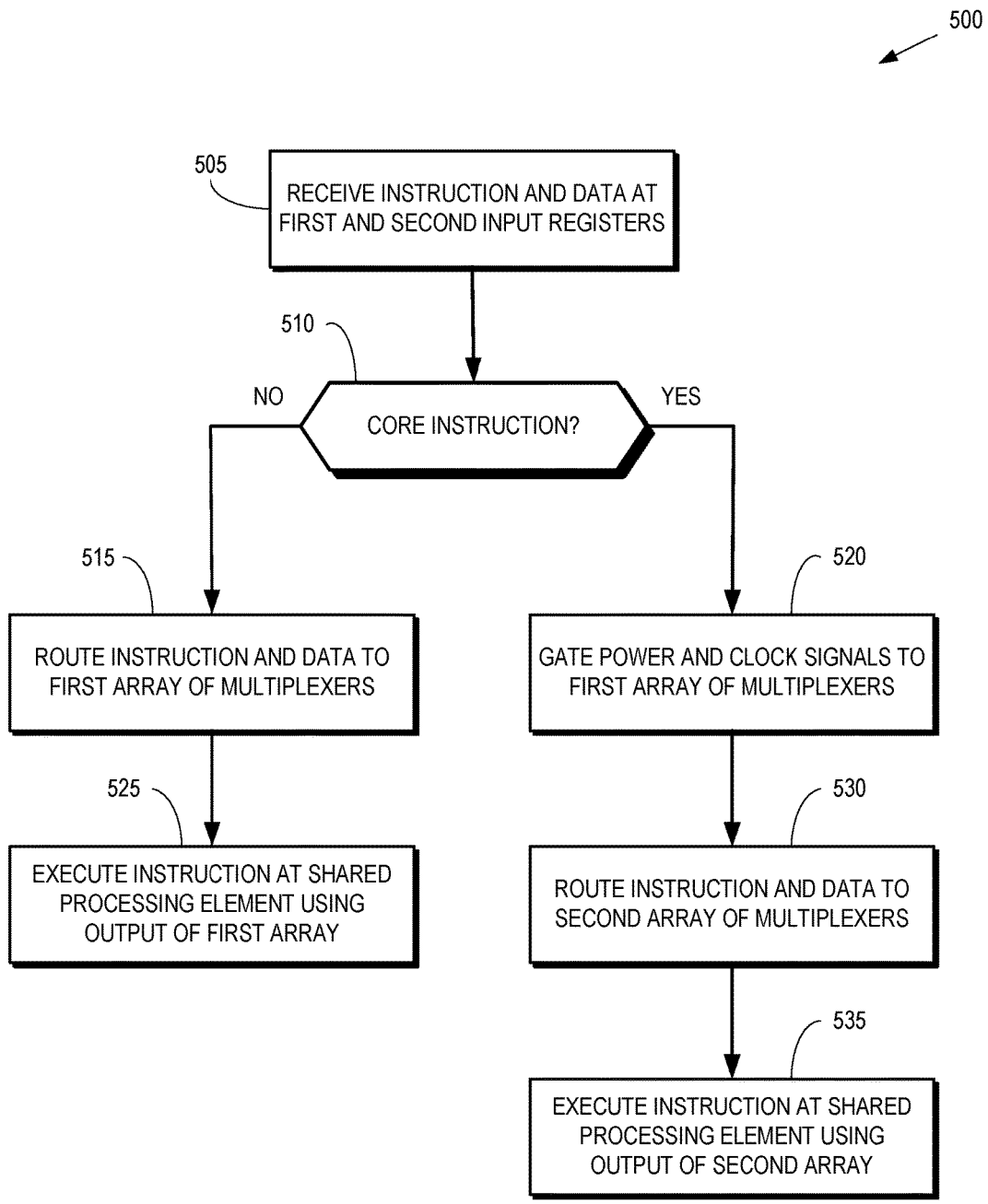
FIG. 5 is a flow diagram of a method of selectively routing instruction information to a shared processing element of a pipeline using different multiplexer arrays according to some embodiments.

FIG. 5 is a flow diagram of a method 500 of selectively routing instruction information to a shared processing element of a pipeline using different multiplexer arrays according to some embodiments. The method is implemented in some embodiments of the pipeline 200 shown in FIG. 2, the pipeline 300 shown in FIG. 3, and the pipeline 400 shown in FIG. 4.

At block 505, the pipeline receives instruction information such as an instruction identifier and associated data at first and second sets of input registers. The instruction information includes an opcode identifying the instruction or a type of the instruction. The associated data includes values of source operands utilized by processing elements in the pipeline. The first set of input registers stores information that is provided to a first multiplexer array and the second set of input registers stores information that is provided to a second multiplexer array. The first multiplexer array receives instruction information for instructions supported by the pipeline and the second multiplexer array receives instruction information for a subset of the instructions supported by the pipeline. The subset of instructions includes instructions (or instruction types) that are frequently used by programs executing on the pipeline. As discussed herein, the number of instructions in the subset is less than the number of instructions supported by the pipeline and so the number of multiplexers in the first multiplexer array is less than the number of multiplexers in the second multiplexer array.

At decision block 510, a controller (such as the control unit 250 shown in FIG. 2) determines whether the instruction is a core instruction or a non-core instruction. The controller determines the type of instruction based on the instruction information received by the pipeline. For example, the controller determines the type of instruction based on an opcode of the instruction stored in the first or second sets of registers. If the instruction is a non-core instruction, the method 500 flows to block 515. If the instruction is a core instruction, the method flows to block 520.

At block 515, the instruction information including the instruction and associated data are routed to the first array of multiplexers. The instruction information is then selectively provided to the shared processing element, e.g., based on control signaling provided by the controller, as discussed herein. At block 525, the shared processing element executes the instruction using instruction information output from the first array of multiplexers.

At block 520, the controller gates power and clock signals to the first array of multiplexers so that the first array of multiplexers do not dissipate power and are not toggled in response to the clock signals. Gating of the power or clock signals can be performed by opening one or more switches or circuits, e.g., using switching transistors. At block 530, the instruction information including the instruction identifier and associated data are routed to the second array of multiplexers. The instruction information is then selectively provided to the shared processing element, e.g., based on control signaling provided by the controller, as discussed herein. At block 535, the shared processing element executes the instruction using instruction information output from the second array of multiplexers.

In some embodiments, the apparatus and techniques described above are implemented in a system comprising one or more integrated circuit (IC) devices (also referred to as integrated circuit packages or microchips), such as the pipeline described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
   a first processing element implemented in a first stage of a pipeline and configured to execute an instruction;
   a first array of multiplexers to provide information associated with the instruction to the first processing element in response to the instruction being in a first set of instructions;
   a second array of multiplexers to provide information associated with the instruction to the first processing element in response to the instruction being in a second set of instructions; and
   a control unit to gate at least one of power or a clock signal provided to the first array of multiplexers in response to the instruction being in the second set.

2. The apparatus of claim 1, wherein the second set of instructions is a subset of the first set of instructions.

3. The apparatus of claim 1, wherein:
   the second set of instructions includes instructions executed by the pipeline at or above a threshold frequency; and
   the first set of instructions includes instructions executed by the pipeline below the threshold frequency.

4. The apparatus of claim 1, wherein the first set of instructions includes at least ten times as many instructions as the second set of instructions.

5. The apparatus of claim 1, wherein the control unit determines that the received instruction is in the second set based on an opcode of the first instruction received by the first stage of the pipeline.

6. The apparatus of claim 1, further comprising:
   at least one third multiplexer to receive output from the first array of multiplexers and the second array of multiplexers and to selectively provide an output from the first array of multiplexers or the second array of multiplexers to the first processing element based on signaling from the control unit.

7. The apparatus of claim 6, wherein the at least one third multiplexer provides the output from the second array of multiplexers to the first processing element in response to the control unit gating the at least one of the power or the clock signal provided to the first array of multiplexers.

8. The apparatus of claim 1, further comprising:
   first input registers to store information associated with the instruction and provide the information to inputs of the first array of multiplexers; and
   second input registers to store the information associated with the instruction and provide the information to the inputs of the second array of multiplexers.

9. The apparatus of claim 8, further comprising:
   a second processing element implemented in a second stage of the pipeline and configured to execute the instruction;
   first output registers to receive information generated by the first processing element;
   a third array of multiplexers to receive information stored in the first output registers and to provide output to the second processing element;
   second output registers to receive the information generated by the first processing element;
   a fourth array of multiplexers to receive information stored in the second output registers and to provide output to the second processing element; and
   wherein the control unit is configured to gate at least one of power or a clock signal provided to the third array of multiplexers in response to the instruction being in the second set.

10. A method comprising:
    receiving an instruction at a first stage of a pipeline of a processing device;
    providing information associated with the instruction from a first array of multiplexers of the processing device to a first processing element implemented in the first stage in response to the instruction being in a first set of instructions;
    providing information associated with the instruction from a second array of multiplexers of the processing device to the first processing element in response to the instruction being in a second set of instructions; and
    gating at least one of power or a clock signal provided to the first array of multiplexers in response to the instruction being in the second set.

11. The method of claim 10, further comprising:
    determining that the received instruction is in the second set based on an opcode of the received instruction received by the first stage of the pipeline.

12. The method of claim 10, further comprising:
    selectively providing output from the first array of multiplexers or the second array of multiplexers to the first processing element based on signaling from a control unit.

13. The method of claim 12, wherein providing the output comprises providing the output from the second array of multiplexers to the first processing element in response to the control unit gating the at least one of the power or the clock signal provided to the first array of multiplexers.

14. The method of claim 13, further comprising:
    receiving the instruction at a second stage of the pipeline that includes a second processing element configured to execute the instruction;
    receiving information generated by the first processing element;
    providing information associated with the instruction from a third array of multiplexers of the processing device to the second processing element in response to the instruction being in the first set;

providing the information associated with the instruction from a fourth array of multiplexers of the processing device to the second processing element in response to the instruction being in the second set; and gating at least one of power or a clock signal provided to the third array of multiplexers in response to the instruction being in the second set.

15. An apparatus comprising:
a first hardware data path including:
   a first processing element implemented in a first stage of a pipeline and configured to execute an instruction; and
   a first array of multiplexers to provide information associated with the instruction to the first processing element in response to the instruction being in a first set of instructions;
a second hardware data path configured to execute half-precision floating-point instructions and to receive information generated by the first processing element in the first hardware data path;
a second array of multiplexers to provide information associated with the instruction to the first processing element in response to the instruction being in a second set of instructions; and
a control unit to gate at least one of power or a clock signal provided to the first array of multiplexers in response to the instruction being in the second set.

16. The apparatus of claim 15, wherein the second set of instructions includes instructions that are executed by the pipeline more frequently than a threshold frequency, and wherein the first set of instructions includes instructions that are executed by the pipeline less frequently than the threshold frequency.

17. The apparatus of claim 15, wherein the control unit determines that the received instruction is in the second set based on an opcode of the instruction received by the first stage of the pipeline.

18. The apparatus of claim 15, wherein the second hardware data path comprises a third array of multiplexers implemented in a second stage of the pipeline to provide information to a second processing element implemented on the first hardware data path in the second stage of the pipeline in response to the instruction being in the second set.

19. The apparatus of claim 18, wherein the control unit is configured to gate at least one of power or a clock signal provided to a fourth array of multiplexers implemented on the first hardware data path in the second stage of the pipeline in response to the instruction being in the second set.

20. The apparatus of claim 15, further comprising:
   a fifth array of multiplexers to selectively provide output from the first hardware data path or the second hardware data path based on control signaling from the control unit.

* * * * *